US012074015B2

(12) United States Patent
Geistanger et al.

(10) Patent No.: US 12,074,015 B2
(45) Date of Patent: Aug. 27, 2024

(54) METHOD FOR CALIBRATING AT LEAST ONE MASS SPECTROMETRY DEVICE

(71) Applicant: Roche Diagnostics Operations, Inc., Indianapolis, IN (US)

(72) Inventors: Andrea Geistanger, Munich (DE); Daniel Intelmann, Schaftlach (DE); Shirin Shahriari, Munich (DE); Anton Hilger, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 259 days.

(21) Appl. No.: 17/805,133

(22) Filed: Jun. 2, 2022

(65) Prior Publication Data

US 2022/0293404 A1 Sep. 15, 2022

Related U.S. Application Data

(63) Continuation of application No. PCT/EP2020/086411, filed on Dec. 16, 2020.

(30) Foreign Application Priority Data

Dec. 17, 2019 (EP) .................................... 19216965

(51) Int. Cl.
*H01J 49/00* (2006.01)

(52) U.S. Cl.
CPC ................................ *H01J 49/0009* (2013.01)

(58) Field of Classification Search
CPC ................................................... H01J 49/0009
See application file for complete search history.

(56) References Cited

U.S. PATENT DOCUMENTS

| | | | | |
|---|---|---|---|---|
| 2009/0048797 | A1 | 2/2009 | Tolmachev et al. | |
| 2014/0156202 | A1 * | 6/2014 | Floridia .............. | H01J 49/0009 702/23 |
| 2019/0206663 | A1 | 7/2019 | Wiederin et al. | |

FOREIGN PATENT DOCUMENTS

| | | | |
|---|---|---|---|
| EP | 0660114 | A2 | 6/1995 |
| JP | 2016164552 | A | 9/2016 |

(Continued)

OTHER PUBLICATIONS

C62-A Liquid Chromatography-Mass Spectrometry Methods; Approved Guideline, Clinical and Laboratory Standards Institute, 2014, 88 pp.

(Continued)

*Primary Examiner* — Hugh Maupin
(74) *Attorney, Agent, or Firm* — Taft Stettinius & Hollister LLP

(57) ABSTRACT

A method for calibrating at least one mass spectrometry device having a first defined hardware configuration comprises at least one manufacturer-site pre-calibration step establishing at least one reference calibration function $f_p$ for a generic type of mass spectrometry devices having a second defined hardware configuration, wherein the second defined hardware configuration is equivalent to the first defined hardware configuration, wherein the reference calibration function $f_p$ describes a relationship of at least one concentration c of at least one analyte in at least one calibrator sample, wherein the reference calibration function $f_p$ is a parametrized function $f_p$(concentration), with $p=(p_1,p_2, \ldots p_n)$ being a set of parameters of the reference calibration function and n being a positive integer; determining calibration values $\hat{p}=(\hat{p}_1,\hat{p}_2, \ldots \hat{p}_n)$ for the set of parameters of the reference calibration function for the generic type of mass spectrometry devices.

13 Claims, 3 Drawing Sheets

(56) References Cited

FOREIGN PATENT DOCUMENTS

| | | | |
|---|---|---|---|
| WO | 2005/040985 | A2 | 5/2005 |
| WO | 2017/178453 | A1 | 10/2017 |

OTHER PUBLICATIONS

Galitzine, Cyril et al., Nonlinear Regression Improves Accuracy of Characterization of Multiplexed Mass Spectrometric Assays, Molecular & Cellular Proteomics, 2018, pp. 913-924, vol. 17.

International Search Report issued Feb. 22, 2021 in Application No. PCT/EP2020/086411, 2 pp.

Peters, Frank T. and Mauer, Hans H., Systematic Comparison of Bias and Precision Data Obtained with Multiple-Point and One-Point Calibration in Six Validated Multianalyte Assays for Quantification of Drugs in Human Plasma, Analytical Chemistry, 2007, pp. 4967-4976, vol. 79.

U.S. Department of Health and Human Services, Food and Drug Administration, Bioanalytical Method Validation Guidance for Industry, https://www.fda.gov/downloads/Drugs/Guidance/ucm070107.pdf, 2018, 44 pp.

* cited by examiner

METHOD FOR CALIBRATING AT LEAST ONE MASS SPECTROMETRY DEVICE

CROSS-REFERENCE TO RELATED APPLICATIONS

This application is a continuation of International Patent Application No. PCT/EP2020/086411, fled 16 Dec. 2020, which claims priority to European Patent Application No. 19216965.4, filed 17 Dec. 2019, the disclosures of which are hereby incorporated by reference in their entirety.

TECHNICAL FIELD

The present disclosure relates to a method for calibrating at least one mass spectrometry device, a method for determining a concentration of an analyte in a sample, a mass spectrometry device, a computer program and a computer program product.

BACKGROUND

Calibration curves for mass spectrometry assays are often based on three to six calibrator levels. This may also be the case for routine sample measurements where a raw signal of a liquid chromatography mass spectrometry device is a function of the concentration. For example, reference is made to "Liquid Chromatography-Mass Spectrometry Methods", Clinical and Laboratory Standards Institute (CLSI) document C62-A, Vol. 34 No. 16 2014, and to "Guidance for industry: Bioanalytical method validation", https://www.fda.gov/downloads/Drugs/Guidance/ucm070107.pdf, US Department of Health and Human Services. Although usual mass spectrometry calibration models are linear or quadratic models, also non-linear models start to be acknowledged as better calibration models for MS assays. In this regard, reference is made to C. Galitzine et al. Nonlinear regression improves accuracy of characterization of multiplexed mass spectrometric assays, Moll Cell Proteomics, 2018.

There are some approaches to reduce the calibration burden to two or even one calibrator levels, especially for linear calibration models, see, for example, Frank T. Peters and Hans H. Maurer, Systematic Comparison of Bias and Precision Data Obtained with Multiple-Point and One-Point Calibration in Six Validated Multianalyte Assays for Quantification of Drugs in Human Plasma, Anal. Chem. 2007, 79, 4967-4976. However, commonly, such approaches are of less quality than calibration with multiple levels.

Due to the high numbers of calibrator levels, calibration of a mass spectrometry assay is a time and material consuming process. For linear calibration curve it may be possible to reduce the number of calibrators to two levels, but for non-linear, e.g., quadratic calibration curves, at least three calibrator levels are needed. For example, for non-linear calibration models at least six calibrator levels are required. However, for random access and routine measurements the calibration effort has to be as low as possible.

It is therefore an objective of the present disclosure to provide a method for calibrating at least one mass spectrometry device, a method for determining a concentration of an analyte in a sample, a mass spectrometry device, a computer program and a computer program product, which avoid the above-described disadvantages of known methods, devices, computer programs and computer program products. In particular, the method for calibrating at least one mass spectrometry device, the method for determining a concentration of an analyte in a sample, the mass spectrometry device, the computer program and the computer program product shall reduce a calibration burden, specifically with respect to time and material, of a mass spectrometry device.

SUMMARY

Although the embodiments of the present disclosure are not limited to specific advantages or functionality, it is noted that in accordance with the present disclosure a method for calibrating at least one mass spectrometry device, a method for determining a concentration of an analyte in a sample, a mass spectrometry device, a computer program and a computer program product are provided that reduce a calibration burden, specifically with respect to time and material, of a mass spectrometry device.

In accordance with one embodiment of the present disclosure, a method for determining a concentration of an analyte in a sample is provided, wherein the method comprises the following steps: conducting a method for calibrating at least one mass spectrometry device having a first defined hardware configuration, the method comprising: at least one manufacturer-site pre-calibration step, comprising: a1: establishing at least one reference calibration function $f_p$ for a generic type of mass spectrometry devices having a second defined hardware configuration, wherein the second defined hardware configuration is equivalent to the first defined hardware configuration, wherein the reference calibration function $f_p$ describes a relationship of at least one concentration c of at least one analyte in at least one calibrator sample, wherein the reference calibration function $f_p$ is a parametrized function $f_p$(concentration) with $p=(p_1, p_2, \ldots p_n)$ being a set of parameters of the reference calibration function and n being a positive integer; a2: determining calibration values $\hat{p}=(\hat{p}_1,\hat{p}_2, \ldots \hat{p}_n)$ for the set of parameters of the reference calibration function for the generic type of mass spectrometry devices; providing to a customer of the mass spectrometry device at least the following: the reference calibration function $f_p$ for the generic type of mass spectrometry devices, the calibration values $\hat{p}=(\hat{p}_1,\hat{p}_2, \ldots \hat{p}_n)$ for the generic type of mass spectrometry devices, and at least one calibrator sample with defined target value of the at least one analyte; and at least one customer-site recalibration step for the mass spectrometry device, comprising: c1: performing at least one calibration measurement using the mass spectrometry device and the calibrator sample, thereby generating at least one calibration signal; c2: generating calibration information based on the calibration signal, wherein in step c2 the calibration information based on the calibration signal is generated by adapting the calibration signal to the reference calibration function $f_{\hat{p}}$, wherein the calibration signal are converted into a theoretical signal $g_{\hat{q}}^{-1}$(calibration signal)=theoretical signal, wherein g is the signal adjustment function defining a relationship between signals of the mass spectrometry device and a theoretical signal of the generic type of mass spectrometry devices and $\hat{q}=(\hat{q}_1, \hat{q}_2, \ldots \hat{q}_m)$ are calibration values of the signal adjustment function, wherein this theoretical signal is transformed into a concentration value by applying the inverse of the reference calibration function $f_{\hat{p}}^{-1}$(theoretical signal)=concentration; conducting at least one measurement comprising measuring the analyte in the sample by using the mass spectrometry device thereby receiving measurement results; adapting the reference calibration function $f_{\hat{p}}$ based on the measurement results or adapting the measurement results to the reference calibration function $f_p$; determining the concentration of the analyte based on the measurement results.

In accordance with another embodiment of the present disclosure, a mass spectrometry device having a first defined hardware configuration is provided, wherein the mass spectrometry device comprises at least one control unit, wherein the control unit is configured for storing at least one reference calibration function $f_p$ for a generic type of mass spectrometry devices having a second defined hardware configuration, wherein the second defined hardware configuration is equivalent to the first defined hardware configuration, wherein the control unit is further configured for storing a set of parameters $p=(p_1,p_2, \ldots p_n)$ of the reference calibration function $f_p$, wherein n is a positive integer, wherein the reference calibration function $f_p$ describes a relationship of a concentration of at least one analyte in at least one calibrator sample, wherein the reference calibration function $f_p$ is a parametrized function $f_p$(concentration); wherein the control unit is further configured for storing calibration values $\hat{p}=(\hat{p}_1, \hat{p}_2, \ldots \hat{p}_n)$ for the set of parameters of the reference calibration function, wherein the control unit is further configured for conducting at least one customer-site recalibration step for the mass spectroscopy device, wherein the recalibration step comprises performing at least one calibration measurement using the mass spectrometry device on at least one calibrator sample sample with defined target value of the at least one analyte, thereby generating at least one calibration signal and wherein the one customer-site recalibration step further comprises generating calibration information based on the calibration signal.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
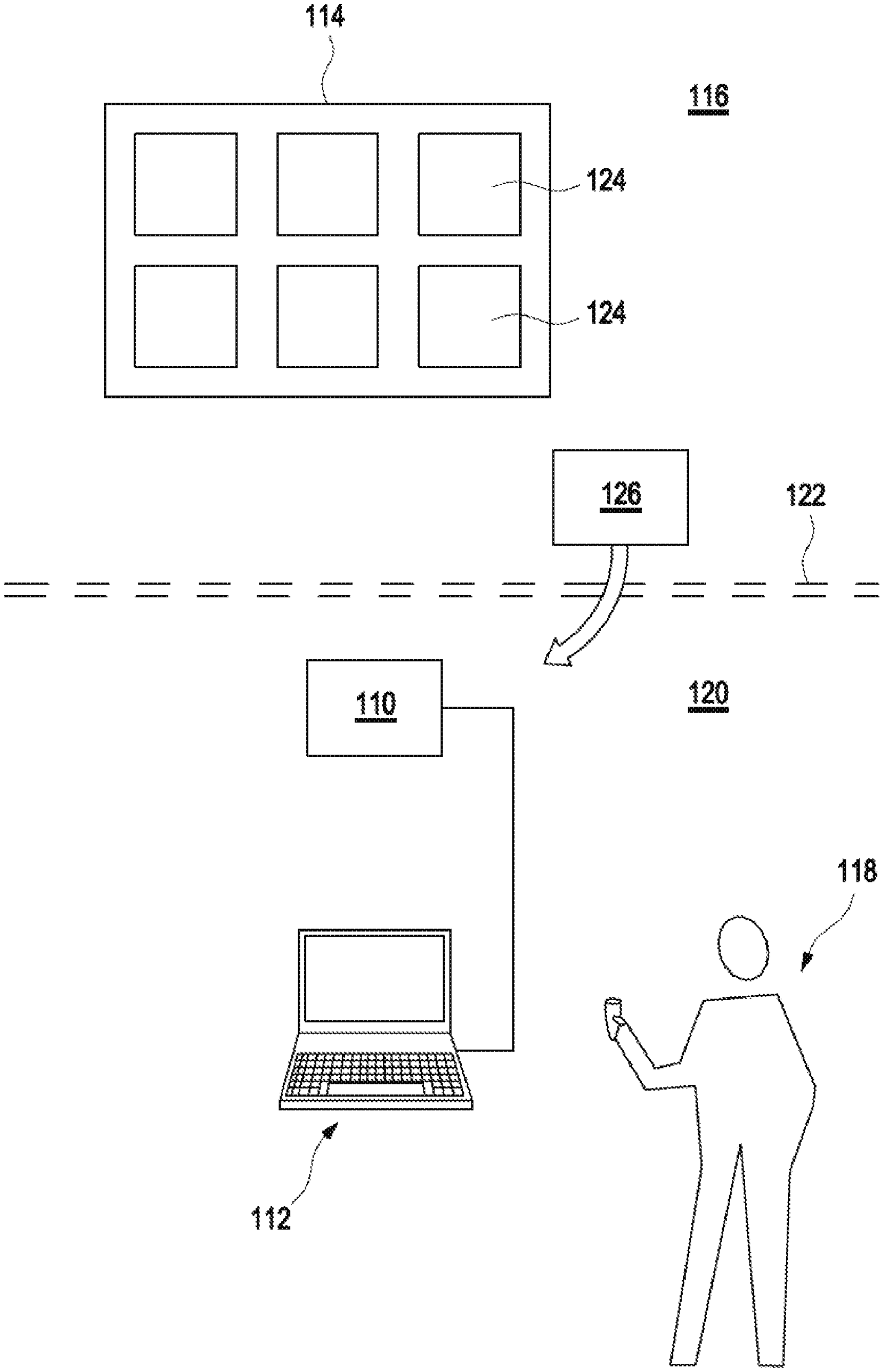
FIG. 1 shows an exemplary embodiment of a mass spectrometry device according to the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present disclosure may, as the skilled person will recognize, be performed by using alternative features. Similarly, features introduced by "in an embodiment of the present disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

In a first aspect of the present disclosure, a method for calibrating at least one mass spectrometry device having a first defined hardware configuration is disclosed.

As used herein, the term "mass spectrometry (MS) device" is a broad term and is to be given its ordinary and customary meaning to a person of ordinary skill in the art and is not to be limited to a special or customized meaning. The term specifically may refer, without limitation, to a mass analyzer configured for detecting at least one analyte based on mass to charge ratio. The mass spectrometry device may specifically be or may comprise a liquid chromatography mass spectrometry device. As used herein, the term "liquid chromatography mass spectrometry device" is a broad term and is to be given its ordinary and customary meaning to a person of ordinary skill in the art and is not to be limited to a special or customized meaning. The term specifically may refer, without limitation, to a combination of liquid chromatography with mass spectrometry. The liquid chromatography mass spectrometry device may be or may comprise at least one high-performance liquid chromatography (HPLC) device or at least one micro liquid chromatography (μLC) device. The liquid chromatography mass spectrometry device may comprise a liquid chromatography (LC) device and a mass spectrometry (MS) device, wherein the LC device and the MS are coupled via at least one interface. The interface coupling a liquid chromatography device and the MS may comprise at least one ionization source configured for generating of molecular ions and for transferring of the molecular ions into the gas phase.

As used herein, the term "liquid chromatography (LC) device" is a broad term and is to be given its ordinary and customary meaning to a person of ordinary skill in the art and is not to be limited to a special or customized meaning. The term specifically may refer, without limitation, to an analytical module configured to separate one or more analytes of interest of a sample from other components of the sample for detection of the one or more analytes with the mass spectrometry device. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest.

The term "analyte" generally refers to an arbitrary element, component or compound which may be present in a sample and the presence and/or the concentration of which may be of interest for a user, a patient or medical staff such as a medical doctor. Particularly, the analyte may be or may comprise an arbitrary chemical substance or chemical compound which may take part in the metabolism of the user or the patient, such as at least one metabolite. The detection of the at least one analyte specifically may be an analyte-specific detection. However, also other kinds of analytes may be feasible.

As used herein, the term "sample" is a broad term and is to be given its ordinary and cus-tomary meaning to a person of ordinary skill in the art and is not to be limited to a special or customized meaning. The term specifically may refer, without limitation, to an arbitrary sample such as a biological sample, also called test sample, a quality control sample, an internal standard sample. The sample may comprise one or more analytes of interest. For ex-ample, the sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by having being mixed with reagents or the like. For example, analytes of interest may be vitamin D, drugs of abuse, therapeutic drugs, hormones, and metabolites in general.

The term "concentration" as used herein is a broad term and is to be given its ordinary and customary meaning to a person of ordinary skill in the art and is not to be limited to a special or customized meaning. The term specifically may refer, without limitation, to an abundance of a constituent divided by a total volume of a mixture such as a solute and/solvents in solution. The concentration may be described by different kinds of quantities such as by a mass concentration, by a molar concentration, by a number concentration or by a volume concentration.

The mass spectrometry device has a first defined hardware configuration. The term "hardware" is a broad term and is to be given its ordinary and customary meaning to a person of ordinary skill in the art and is not to be limited to a special or customized meaning. The term specifically may refer, without limitation, to a physical and/or tangible part of the mass spectrometry device. For example, the hardware may comprise one or more of: sample preparation unit, a liquid chromatography unit, and a mass spectrometer, in particular a quadrupole mass spectrometer. The mass spectrometer may be a triple quadrupole mass spectrometer. The term "hardware configuration" is a broad term and is to be given its ordinary and customary meaning to a person of ordinary skill in the art and is not to be limited to a special or customized meaning. The term specifically may refer, without limitation, to specific setting of hardware components of a particular instrument. For example, the setting may be application specific and/or may vary due to manufacturing tolerances. The term "defined hardware configuration" is a broad term and is to be given its ordinary and customary meaning to a person of ordinary skill in the art and is not to be limited to a special or customized meaning. The term specifically may refer, without limitation, to the fact that each manufactured mass spectrometry device has a specific or particular hardware configuration.

The hardware configuration may have a definite outline or specification. As further used herein, the terms "first" and "second" may be considered as nomenclature only, without numbering or ranking the named elements, without specifying an order and without excluding a possibility that several kinds of hardware configurations may be present. Further, additional defined hardware configurations such as one or more third defined hardware configurations may be present.

The terms "calibration" and "calibrating" are broad terms and are to be given its ordinary and customary meaning to a person of ordinary skill in the art and are not to be limited to a special or customized meaning. The terms specifically may refer, without limitation, to an operation or a process of operation that determines a relationship between measurement signals generated by the mass spectrometry device and a true concentration results of a sample. As will be outlined in details below, the calibration may be split up and/or broken into two pieces or parts. In a first step, a reference calibration function which describes a relationship between a concentration and measurement signals generated by a generic mass spectrometry device, also denoted reference mass spectrometry device, coming from the properties for the analyte to be measured. This task may require a lot of effort, such as involving multiple instruments and replicate measurements. This task may be performed at the manufacturer-site. In a second step, in order to obtain the true concentration result of samples on a particular instrument, an adaption of the reference calibration function may be made.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:

a) at least one manufacturer-site pre-calibration step, comprising:
   - a1: establishing at least one reference calibration function $f_p$ for a generic type of mass spectrometry devices having a second defined hardware configuration, wherein the second defined hardware configuration is equivalent to the first defined hardware configuration, wherein the reference calibration function $f_p$ describes a relationship of at least one concentration c of at least one analyte in at least one calibrator sample, wherein the reference calibration function $f_p$ is a parametrized function $$f_p(\text{concentration})$$

with $p=(p_1, p_2, \ldots p_n)$ being a set of parameters of the reference calibration function and n being a positive integer;
   - a2: determining calibration values $\hat{p}=(\hat{p}_1, \hat{p}_2, \ldots \hat{p}_n)$ for the set of parameters of the reference calibration function for the generic type of mass spectrometry devices;

b) providing to a user of the mass spectrometry device at least the following: the reference calibration function $f_p$ for the generic type of mass spectrometry devices, the calibration values $\hat{p}=(\hat{p}_1,\hat{p}_2, \ldots \hat{p}_n)$ for the generic type of mass spectrometry devices, and at least one calibrator sample with defined target value of at least one analyte; and c) at least one customer-site recalibration step for the mass spectrometry device, comprising:

c1: performing at least one calibration measurement using the mass spectrometry device with at least one calibrator sample, thereby generating at least one calibration signal;

c2: generating calibration information based on the calibration signal.

The method may specifically be a computer-implemented method. The term "computer implemented method" as used herein is a broad term and is to be given its ordinary and customary meaning to a person of ordinary skill in the art and is not to be limited to a special or customized meaning. The term specifically may refer, without limitation, to a method involving at least one computer and/or at least one computer network. The computer and/or computer network may comprise at least one processor which is configured for performing at least one of the method steps of the method according to the present disclosure. Typically, several of the method steps may be performed by the computer and/or computer network. The method may be performed partially or completely automatically, specifically without user interaction. The term "automatically" as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

Further, the method step a) may be performed by the computer-implementable processing line. Specifically, one or both of steps a1 and a2 may be performed by the at least one computer-implementable processing line. Specifically, the method step c) may be performed fully automatic. For example, the method step c) may be performed by at least one computer-implementable processing line. Specifically, one or both of steps c1 and c2 may be performed by the computer-implementable processing line. Specifically, one or more of the method steps a1, a2, c1, c2 may be performed by a computer.

The term "step" as used herein is a broad term and is to be given its ordinary and customary meaning to a person of ordinary skill in the art and is not to be limited to a special or customized meaning. The term specifically may refer, without limitation, to a work step, a process step or a stage of an operation or a procedure. Thus, the term "calibration step" as used herein is a broad term and is to be given its ordinary and customary meaning to a person of ordinary skill in the art and is not to be limited to a special or customized meaning. The term specifically may refer, without limitation, to a stage of an operation, which comprises a conducting of a calibration. The term "pre-calibration step" as used herein is a broad term and is to be given its ordinary and customary meaning to a person of ordinary skill in the art and is not to be limited to a step which may be, in terms of time, conducted before a main calibration step is carried out. However, additionally or alternatively, the pre-calibration step itself may include a first calibration process. The first calibration process may be conducted before a second calibration process is carried out.

The term "manufacturer" as used herein is a broad term and is to be given its ordinary and customary meaning to a person of ordinary skill in the art and is not to be limited to a special or customized meaning. The term specifically may refer, without limitation, to at least one producer of the mass spectrometry device. The term "manufacturer" may further refer to a single manufacturer producing all parts of the mass spectrometry device and/or to a plurality manufacturers such as suppliers for specific components of the mass spectrometry device. The manufacturer may be the final manufacturer providing the final product for use by a customer. The term "manufacturer-site" as used herein is a broad term and is to be given its ordinary and customary meaning to a person of ordinary skill in the art and is not to be limited to a special or customized meaning. The term specifically may refer, without limitation, to all processes which were performed by the manufacturer before providing the mass spectrometry device to the customer. All reagents, columns, calibrators, system reagents, disposables may be produced by or for the manufacturer. In contrary at the customer-site, the customer can place patient samples and control samples as non-manufacturer components on the instrument. The establishment of a reference calibration function may be done during standardization process at the manufacturer-site. This may allow to invest more effort as solely one single calibration event on a single instrument.

In step a1, the reference calibration function is established. The term "establishing" is a broad term and is to be given its ordinary and customary meaning to a person of ordinary skill in the art and is not to be limited to a special or customized meaning. The term specifically may refer, without limitation, to determining and/or fitting and/or deriving the reference calibration function. Specifically, a mathematical function may be determined. The process may specifically be conducted in a computer-assisted matter.

The term "generic type of mass spectrometry devices" is a broad term and is to be given its ordinary and customary meaning to a person of ordinary skill in the art and is not to be limited to a special or customized meaning. The term specifically may refer, without limitation, to a reference and/or prototype mass spectrometry devices such as of a series, in particular at the manufacturer-site.

The second defined hardware configuration is equivalent to the first defined hardware configuration. The term "equivalent" is a broad term and is to be given its ordinary and customary meaning to a person of ordinary skill in the art and is not to be limited to a special or customized meaning. The term specifically may refer, without limitation, to an equality in an embodiment and/or a function of two or more defined hardware configurations. Thus, the first defined hardware configuration and the second defined hardware configuration may fulfill a same function and/or may be identical in its structure. The particular instrument at the customer-site may be within manufacturer tolerances identical to the generic type of mass spectrometry device. Specifically, the generic type of mass spectrometry devices may have a same or similar hardware configuration as the particular instrument. However, also other kinds of common properties may be feasible.

The term "function" is a broad term and is to be given its ordinary and customary meaning to a person of ordinary skill in the art and is not to be limited to a special or customized meaning. The term specifically may refer, without limitation, to a mathematical function. The function may comprise one or more variables and, optionally, one or more parameters. Specifically, the function may assign a value to a functional value. The function may exemplarily be a linear function or a quadratic function. However, also other embodiments may be feasible. The term "calibration function" is a broad term and is to be given its ordinary and customary meaning to a person of ordinary skill in the art and is not to be limited to a special or customized meaning. The term specifically may refer, without limitation, to an arbitrary function which is applicable in a calibration process.

The term "reference calibration function", also denoted calibration model, is a broad term and is to be given its ordinary and customary meaning to a person of ordinary skill in the art and is not to be limited to a special or customized meaning. The term specifically may refer, without limitation, to a calibration function which describes a relation between the concentration c and a signal, denoted "theoretical signal". Specifically, the reference calibration function of a particular general LC/MS device describes the relationship between peak area ratios and concentration of the particular analyte on the particular instrument. The theoretical signal may be a signal of the reference mass spectrometry device. The signal may be a peak are ratio The reference calibration may be non-instrument specific. Specifically, the reference calibration function may describe a relationship between the concentration of the at least one analyte and at least one corresponding theoretical signal for the specific analyte. The establishing of the reference calibration function may comprise involving multiple instruments and/or replicate measurements. Exemplarily, for this purpose, measurements on several different reference mass spectrometry devices may be conducted and several calibration curves may be determined. The reference calibration function may be determined as mean of the several calibration curves. The reference calibration function may also be referred to as master calibration function.

The reference calibration function is a parametrized function $f_p$(concentration) with $p=(p_1, p_2, \ldots p_n)$ being a set of parameters of the reference calibration function and n being a positive integer. The term "parametrized function" is a broad term and is to be given its ordinary and customary meaning to a person of ordinary skill in the art and is not to be limited to a special or customized meaning. The term specifically may refer, without limitation, to an arbitrary mathematical function having at least one parameter, specifically at least two parameters. The term "parameter" is a broad term and is to be given its ordinary and customary meaning to a person of ordinary skill in the art and is not to be limited to a special or customized meaning. The term specifically may refer, without limitation, to an arbitrary quantity which influences an output or a behavior of a mathematical function but is viewed as being held constant. Thus, the parameter may be configured for determining a behavior of the mathematical function. To the contrary, a variable of a mathematical function may be reviewed as changing the parameter typically either does not change or changes more slowly. The term "set of parameters" may generally refer to a plurality of parameter of a single mathematical function. The relationship between the concentration of the at least one analyte and at least one corresponding theoretical signal for the analyte may be expressed by $$f\text{: concentration}\rightarrow\text{theoretical signal}$$

$$f_p(\text{concentration})=\text{theoretical signal}$$

with $p=(p_1,p_2, \ldots p_n)$ being the set of parameters of the reference calibration function and n being a positive integer.

In step a2, the calibration values $\hat{p}=(\hat{p}_1, \hat{p}_2, \ldots \hat{p}_n)$ for the set of parameters of the reference calibration function for the generic type of mass spectrometry devices are determined. The determining of the calibration values may comprise a process of calculation and/or of fitting. The determining may specifically be conducted in a computer-assisted matter. The term "value" as further used herein may refer to a value of a parameter of a mathematical function. The term "calibration value" as further used herein may refer to an established value of a parameter of the reference calibration function. For example, the determining may comprise recording a plurality of signals from a plurality of replicate measurements of the reference mass spectrometry device using the calibrator sample or a plurality of calibrator samples and/or of a plurality of the reference mass spectrometry devices using the calibrator sample or a plurality of calibrator samples. For each of the recorded signals a corresponding concentration may be known. The determining of the calibration values may comprise at least one fitting procedure. The fitting procedure may comprise the reference calibration function $f_p$ as fit function and start values for the set of parameters of the reference calibration function. Specifically, the calibration value may refer to an established value of one of the parameters of the set of parameters of the parametrized function, e.g., established by using the fitting procedure. The determining of the calibration values may be performed during a standardization process at the manufacturer-site.

The reference calibration function may be a linear function. In other embodiments, the reference calibration function may be a non-linear function such as a rational function. In dependency on the reference calibration function the number of the parameters p may vary. As an example, in case of a linear function, a slope and an intercept may be expressed by parameters p. As a further example, upper and lower asymptotes and a monotonous slope may be expressed by parameters p.

The reference calibration function describes a relationship of at least one concentration c of the at least one analyte of the at least one calibrator sample. The term "calibrator sample", is a broad term and is to be given its ordinary and customary meaning to a person of ordinary skill in the art and is not to be limited to a special or customized meaning. The term specifically may refer, without limitation, to an arbitrary sample having a defined target value. Specifically, the defined target value may be a known target value. Specifically, the defined target value may be a known concentration of a substance of the calibrator sample.

For example, the calibrator sample may be an internal standard sample. The internal standard sample may be a sample comprising at least one internal standard substance with a known concentration. The concentration of the internal standard substance in the sample may be determined in a reference laboratory. The internal standard sample may be measured and respective target values may be assigned. The internal standard substance may be identical to the analyte of interest or may be an analyte which generates by reaction or derivatization an analyte identical to the analyte of interest and/or may be an analyte of which the concentration is known and/or may be a substance which mimics the analyte of interest or that can be otherwise correlated to a certain analyte of interest.

For example, the calibrator sample may be at least one commercial calibrator. Target values, i.e., the concentration of at least one analyte of the sample, may be determined using at least one standardization set. The standardization set may comprise samples which were measured by a reference laboratory and to which at least one target value was assigned. The target values of this so called master calibrators, also denoted master calibrator target values, may be assigned by using the standardization set. These master calibrators with assigned target values may be used for determining the reference calibration function.

The calibrator sample provided in step b) and used in step c) may be a commercial calibrator sample. The manufacturer may provide the target values for the commercial calibrator sample to the customer. Specifically, the target values of the commercial calibrator sample may be determined by the manufacturer by using the master calibrator target values.

In step b) at least one information package is provided to the customer. In step b), at least the following is provided to the user of the mass spectrometry device: the reference calibration function $f_p$ for the generic type of mass spectrometry devices, the calibration values $\hat{p}=(\hat{p}_1,\hat{p}_2, \ldots \hat{p}_n)$ for the generic type of mass spectrometry devices, and at least one calibrator sample. The term "providing" is a broad term and is to be given its ordinary and customary meaning to a person of ordinary skill in the art and is not to be limited to a special or customized meaning. The term specifically may refer, without limitation, to a process of transferring information and/or physical objections to another unity. The providing of the reference calibration function $f_p$, and/or of the calibration values $\hat{p}=(\hat{p}_1,\hat{p}_2, \ldots \hat{p}_n)$ for the generic type of mass spectrometry devices may specifically be conducted electronically. The providing may be performed during delivery of the mass spectrometry device to the customer.

In the customer-site recalibration step, at least one calibrator sample be used. The number of calibrator samples and number of replicates to be run by the customer may be assay specific.

In step c), the customer-site recalibration step for the mass spectrometry device is performed. The term "recalibration" is a broad term and is to be given its ordinary and customary meaning to a person of ordinary skill in the art and is not to be limited to a special or customized meaning. The term specifically may refer, without limitation, to an adaption of the reference calibration function to a signal situation of the particular instrument of the customer. Thus, the term "recalibration step" is a broad term and is to be given its ordinary and customary meaning to a person of ordinary skill in the art and is not to be limited to a special or customized meaning. The term specifically may refer, without limitation, to a stage of an operation, which comprises a conducting of a recalibration. The recalibration step may be performed in order to obtain the true calibration results of samples on the particular instrument. The recalibration may comprise an adaption of the reference calibration function. This can be accomplished either by adapting of the reference calibration function to the signal situation of the particular instrument and/or by adapting of the signals of the particular instrument to the reference calibration function. For adapting of the reference calibration function to the signal situation of the particular instrument, the parameters of the calibration function may be changed. For adapting of the signals of the particular instrument to the reference calibration function, all instrument signals, e.g., peak area ratios, of the measured samples may be converted into so called-reference signals and these reference signals may be transformed into concentrations based on the pre-determined reference calibration curve.

The adaptation of the reference calibration function to the signal situation of a particular mass spectrometry device used by a customer, is the instrument specific assay calibration. In order to obtain the true concentration results of samples on a particular mass spectrometry device, an adaptation of the information on the reference calibration function may be made. This may be accomplished by the adaptation of the peak area ratios of a particular mass spectrometry device to the reference calibration function.

For both adaption steps, the information package for the customer may be the same. The customer may receive at least one calibrator sample with target value and parameters of the reference calibration curve and the reference calibration curve. The term "customer-site step" is a broad term and is to be given its ordinary and customary meaning to a person of ordinary skill in the art and is not to be limited to a special or customized meaning. The term specifically may refer, without limitation, to a step, e.g., to a process, which is conducted by a customer. Thus, the process may be conducted without the manufacturer. However, the manufacturer may provide support to the customer if required.

In step c1, at least one calibration measurement is conducted using the mass spectrometry device. The term "calibration measurement" is a broad term and is to be given its ordinary and customary meaning to a person of ordinary skill in the art and is not to be limited to a special or customized meaning. The term specifically may refer, without limitation, to a measurement of the mass spectrometry device of the customer on the provided calibrator sample. Thereby, the calibration signals may be generated, e.g., acquired. The term "calibration signal" is a broad term and is to be given its ordinary and customary meaning to a person of ordinary skill in the art and is not to be limited to a special or customized meaning. The term specifically may refer, without limitation, to a signal of the mass spectrometry device of the customer acquired in the re-calibration step. The signal may be acquired for a desired calibrator sample.

The method step c), specifically the method step c1, may specifically be conducted with a maximum of two or three calibrator samples. However, also a conducting of the method step c) with a higher number of calibrator samples may be feasible. Exemplarily, the method step c), specifically the method step c1, may be conducted with at least four or at least five calibrator samples.

In step c2, calibration information based on the calibration signals is generated. The term "generating" is a broad term and is to be given its ordinary and customary meaning to a person of ordinary skill in the art and is not to be limited to a special or customized meaning. The term specifically may refer, without limitation, to a process of determining the calibration information. This process may specifically be conducted in a computer-assisted matter. The term "calibration information" is a broad term and is to be given its ordinary and customary meaning to a person of ordinary skill in the art and is not to be limited to a special or customized meaning. The term specifically may refer, without limitation, to at least one relationship between the signal of the mass spectrometry device of the customer, the theoretical signal of the reference mass spectrometry device and the concentration.

Specifically, in step c2, a so called signal adjustment function g may be used. The signal adjustment function may give the relationship between the signal of the mass spectrometry device of the customer, denoted calibration signal in case of measuring the calibrator sample, and the theoretical signal of the reference mass spectrometry device. The signal adjustment function may be defined by $$g\text{: theoretical signal} \rightarrow \text{calibration signal}$$

$$g_q(\text{theoretical signal}) = \text{calibration signal}$$

wherein $q=(q_1, q_2, \ldots q_m)$ are a set of parameters of the signal adjustment function and m is a positive integer. The dimension n of the set of parameters of the reference calibration function for the generic type of mass spectrometry devices may exceed the dimension m of the set of parameters of the signal adjustment function: $n>m$, specifically $n>m+1$.

Specifically, the signal adjustment function may be a linear function. Further, optionally, the reference calibration function may also be a linear function. However, the signal adjustment function may also be a non-linear function such as a rational function. In dependency on the signal adjustment function the number of the parameters q may vary. As an example, in case of a linear function, a slope and an intercept may be expressed by parameters q. As a further example, upper and lower asymptotes and a monotonous slope may be expressed by parameters q.

Generally, for determining the concentration from the signal of the mass spectrometry device of the customer, also denoted sample reading, the following two inverse functions are required:

$$g_{\hat{q}}^{-1}(\text{calibration signal})=\text{theoretical signal},$$

$$f_{\hat{p}}^{-1}(\text{theoretical signal})=\text{concentration},$$

wherein with $\hat{q}=(\hat{q}_1, \hat{q}_2, \ldots \hat{q}_m)$ are established parameters of the signal adjustment function, which may be established during the calibration on the mass spectrometry device of the customer by using the calibrator sample. $g_{\hat{q}}^{-1}$ may be an inverse function of the signal adjustment function $g_{\hat{q}}$.

The calibrator sample, in particular the commercial calibrator sample, may be placed on the particular mass spectrometry device and a relationship is generated between the reference peak area ratios based on the reference calibration function and the peak area ratios of this mass spectrometry device. With this relationship all subsequent peak area ratios of measured samples can be converted into reference peak area ratios and these reference peak area ratios are transformed into concentrations based on the reference calibration function.

For example, for establishing the parameters of the signal adjustment function, the calibrator sample is placed on the mass spectrometry device of the customer and at least one calibrator signal is determined. For the signal adjustment function g a linear relationship may be estimated between the theoretical signals of this calibrator sample and the measured signal of the mass spectrometry device of the customer. For example, the signal adjustment function may be given by $$g_q(\text{theoretical signal})=q_1+q_2*\text{theoretical signal}=\text{calibration signal},$$

wherein the theoretical signals for the calibrator sample are calculated based on the reference calibration function. By solving the equation, parameters $q_i$ can be established.

In step c2 the calibration information based on the calibration signal may be generated by adapting the reference calibration function $f_{\hat{p}}$ based on the calibration signals. For adapting of the reference calibration function to the signal situation of the particular instrument, the concentration of a measured sample can be determined by changing the function $f_{\hat{p}}^{-1}$ into a function $\tilde{f}_{\hat{p}}$ through application of $$f_{\hat{p}}^{-1}(g_{\hat{p}}^{-1}(\text{calibrator signal}))=\tilde{f}_{\hat{p}}(\text{calibrator signal}).$$

Thus, the parameters of the reference calibration function may be updated, e.g., adapted. Further, additionally or alternatively, a form of the reference calibration function may be updated.

In step c2 the calibration information based on the calibration signal may be generated by adapting the calibration signal to the reference calibration function $f_{\hat{p}}$. For adapting of the signals of the particular instrument to the reference calibration function, the inverse functions may be applied one after the other. First, the signal of the mass spectrometry device of the customer for a particular calibrator sample may be converted into a theoretical signal $$g_{\hat{q}}^{-1}(\text{calibration signal})=\text{theoretical signal}.$$

In a second step, this theoretical signal may be transformed into a concentration value by applying the inverse of the reference calibration function $$f\hat{p}^{-1}(\text{theoretical signal})=\text{concentration}.$$

Further, at least one additional signal adjustment mechanism may be incorporated. The additional signal adjustment mechanism may comprise an extension of a validity of the method for calibrating at least one mass spectrometry device. In an embodiment, the calibration signal may correspond to a peak area ratio between the analyte and an internal standard. Further, a kinetic of an internal standard peak area, e.g., a degradation kinetic or an evaporation kinetic of the internal standard, may be known. The kinetic function may be denoted as k and the time may be denoted as t:

$$k_r(\text{Peak Area ISTD}(t=0),t)\rightarrow\text{Peak Areas ISTD}(t)$$

$$k_r(\text{Peak Area ISTD}(t=0),t)=\text{Peak Area ISTD}(t)$$

For sample reading at time t a theoretical peak area of the internal standard at time point t=0, e.g., a point in time when the calibration is established on the mass spectrometry device, may be determined by $$k_r^{-1}(\text{Peak Area ISTD}(t),t)\rightarrow\text{Peak Areas ISTD}(t=0),$$

wherein $k_r^{-1}$ may be an inverse function of the kinetic function. An adjusted peak area ratio may be determined. The adjusted peak area ratio may enter the inverse function of the signal adjustment function:

$$g_{\hat{q}}^{-1}\left(\frac{\text{Peak Area Analyte}}{\text{Peak Area } ISTD(t=0)}\right)=\text{theoretical signal}$$

Further, the theoretical calibration signal may be converted into a concentration by applying the inverse of the reference calibration function:

$$f_{\hat{p}}^{-1}(\text{theoretical signal})=\text{concentration}$$

The method may comprise an additional first signal adjustment. As outlined above, at least one additional signal adjustment mechanism may be proposed. The additional signal adjustment mechanism may comprise using a measured raw signal obtained by the mass spectrometry device. This raw signal may be applied into the function $g_{\hat{q}}^{-1}$ and may be converted in a theoretical signal which can be used for determining the concentration. The additional first signal adjustment may comprise adjusting and/or correcting of the raw signal, also denoted first signal, of the mass spectrometry device before applying it into the function $g_{\hat{q}}^{-1}$. For example, the raw signal may be adjusted and/or corrected based on kinetic data such as based on time information. The time information, for example, may comprise information on how long the sample was waiting and/or standing in the mass spectrometry device. The adjusting and/or correcting of the raw signal may be performed by using the kinetic function $k_r$ which is a function of the time.

In a further aspect of the present disclosure, a method for determining a concentration of an analyte in a sample is disclosed.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:

i. conducting the method for calibrating at least one mass spectrometry device as described above or as will further be described below in more detail;

ii. conducting at least one measurement comprising measuring the analyte in the sample by using the mass spectrometry device thereby receiving measurement results;

iii. adapting the reference calibration function $f_{\hat{p}}$ based on the measurement results or adapting the measurement results to the reference calibration function $f_{\hat{p}}$;

iv. determining the concentration of the analyte based on the measurement results.

Specifically, step iii. may comprise considering the additional measurement result for determining the reference calibration function, for example an updated mean of the calibration curves may be determined.

In a further aspect of the present disclosure, a mass spectrometry device having a first defined hardware configuration is disclosed. The mass spectrometry device comprises at least one control unit. The control unit is configured for storing at least one reference calibration function $f_p$ for a generic type of mass spectrometry devices having a second defined hardware configuration. The second defined hardware configuration is equivalent to the first defined hardware configuration. The control unit is further configured for storing a set of parameters $p=(p_1,p_2, \ldots p_n)$ of the reference calibration function $f_p$, wherein n is a positive integer, wherein the reference calibration function $f_p$ describes a relationship of at least one concentration c of at least one analyte in at least one calibrator sample, wherein the reference calibration function $f_p$ is a parametrized function $$f_p(\text{concentration}).$$

The control unit is further configured for storing calibration values $\hat{p}=(\hat{p}_1, \hat{p}_2, \ldots \hat{p}_n)$ for the set of parameters of the reference calibration function. The control unit is further configured for conducting at least one customer-site recalibration step for the mass spectrometry device. The recalibration step comprises performing at least one calibration measurement using the mass spectrometry device on at least one calibrator sample, thereby generating at least one calibration signal. The customer-site recalibration step further comprises generating calibration information based on the calibration signal.

The mass spectrometry device may be configured for performing the method for calibrating at least one mass spectrometry device according the method for calibrating at least one mass spectrometry device as described above or as will further be described below in more detail.

The term "control unit" generally refers to an arbitrary device adapted to perform the method steps as described above, typically by using at least one data processing device and, more typically, by using at least one processor and/or at least one application-specific integrated circuit. Thus, as an example, the at least one control unit, also denoted evaluation device, may comprise at least one data processing device having a software code stored thereon comprising a number of computer commands. The evaluation device may provide one or more hardware elements for performing one or more of the named operations and/or may provide one or more processors with software running thereon for performing one or more of the method steps.

In a further aspect of the present disclosure, a computer program is disclosed. The computer program is adapted to perform the method step c) of the method for calibrating at least one mass spectrometry device as described above or as will further be described below in more detail while the program is being executed on a computer or a computer network, specifically on a processor. The computer-program may include computer-executable instructions for performing the method for calibrating at least one mass spectrometry device, specifically for performing step c).

Thus, generally speaking, disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of the method steps as indicated above may be performed by using a computer or a computer network, typically by using a computer program. The computer specifically may be fully or partially integrated in a mass spectrometry device, and the computer programs specifically may be embodied as a software. Alternatively, however, at least part of the computer may also be located outside the mass spectrometry device.

In a further aspect, a computer program comprising program means for performing step c) of the method for calibrating at least one mass spectrometry device as described above or as will further be described below in more detail while the computer program is being executed on a computer or on a computer network is disclosed. Specifically, the program means may be stored on a storage medium which may be readable to a computer.

In a further aspect of the present disclosure, a computer program product having program code means is disclosed. The program code means can be stored or are stored on a storage medium, for performing step c) of the method for calibrating at least one mass spectrometry device as described above or as will further be described below in more detail when the program code means are executed on a computer or on a computer network. Specifically, the program code means may be stored on a computer-readable data carrier. As used herein, a computer program product refers to the program as a tradable product. The product may generally exist in an arbitrary format, such as in a paper format, or on a computer-readable data carrier. Specifically, the computer program product may be distributed over a data network.

In a further aspect, a computer or computer network comprising at least one processor is disclosed. The processor is adapted to perform step c) of the method for calibrating at least one mass spectrometry device as described above or as will further be described below in more detail.

In a further aspect, a computer loadable data structure that is adapted to perform step c) of the method for calibrating at least one mass spectrometry device as described above or as will further be described below in more detail while the data structure is being executed on a computer is disclosed.

In a further aspect, a storage medium is disclosed wherein a data structure is stored on the storage medium and wherein the data structure is adapted to perform step c) of the method for calibrating at least one mass spectrometry device as described above or as will further be described below in more detail after having been loaded into a main and/or working storage of a computer or of a computer network. The storage medium may specifically refer to a data carrier. The data structure may be loaded into a computer or computer network, such as into a working memory or main memory of the computer or computer network, and the method may be executed.

Summarizing and without excluding further possible embodiments, the following embodiments may be envisaged:

Embodiment 1: A method for calibrating at least one mass spectrometry device having a first defined hardware configuration, the method comprising:

a) at least one manufacturer-site pre-calibration step, comprising:

a1: establishing at least one reference calibration function $f_p$ for a generic type of mass spectrometry devices having a second defined hardware configuration, wherein the second defined hardware configuration is equivalent to the first defined hardware configuration, wherein the reference calibration function $f_p$ describes a relationship of at least one concentration c of at least one analyte in at least one calibrator sample, wherein the reference calibration function $f_p$ is a parametrized function $$f_p(\text{concentration})$$

with $p=(p_1,p_2, \ldots p_n)$ being a set of parameters of the reference calibration function and n being a positive integer;

a2: determining calibration values $\hat{p}=(\hat{p}_1, \hat{p}_2, \ldots \hat{p}_n)$ for the set of parameters of the reference calibration function for the generic type of mass spectrometry devices;

b) providing to a customer of the mass spectrometry device at least the following: the reference calibration function $f_p$ for the generic type of mass spectrometry devices, the calibration values $\hat{p}=(\hat{p}_1, \hat{p}_2, \ldots \hat{p}_n)$ for the generic type of mass spectrometry devices, and at least one calibrator sample with known target value; and c) at least one customer-site recalibration step for the mass spectrometry device, comprising:

c1: performing at least one calibration measurement using the mass spectrometry device and the at least single calibrator sample, thereby generating at least one calibration signal;

c2: generating calibration information based on the calibration signal.

Embodiment 2: The method according to the preceding embodiment, wherein in step c2 the calibration information based on the calibration signal is generated by adapting the reference calibration function $f_{\hat{p}}$ based on the calibration signal.

Embodiment 3: The method according to the preceding embodiment, wherein for adapting of the reference calibration function, a concentration of a measured calibrator sample can be determined by changing the function $f_{\hat{p}}^{-1}$ into a function $\tilde{f}_{\hat{p}}$ through application of $$f_{\hat{p}}^{-1}(g_{\hat{p}}^{-1}(\text{calibrator signal}))=\tilde{f}_{\hat{p}}(\text{calibrator signal}),$$

wherein g is a signal adjustment function defining a relationship between signals of the mass spectrometry device and a theoretical signal of the generic type of mass spectrometry devices.

Embodiment 4: The method according to any one of the two preceding embodiments, wherein the calibration values $\hat{p}=(\hat{p}_1,\hat{p}_2, \ldots p_n)$ are adapted based on the calibration signal.

Embodiment 5: The method according to any one of the preceding embodiments, wherein in step c2 the calibration information based on the calibration signal is generated by adapting the calibration signal to the reference calibration function $f_{\hat{p}}$.

Embodiment 6 The method according to the preceding embodiment, wherein the calibration signals are converted into a theoretical signal $$g_{\hat{q}}^{-1}(\text{calibration signal})=\text{theoretical signal},$$

wherein g is the signal adjustment function defining a relationship between signals of the mass spectrometry device and a theoretical signal of the generic type of mass spectrometry devices and $\hat{q}=(\hat{q}_1, \hat{q}_2, \ldots \hat{q}_m)$ are calibration values of the signal adjustment function, wherein this theoretical signal is transformed into a concentration value by applying the inverse of the reference calibration function $$f_{\hat{p}}^{-1}(\text{theoretical signal})=\text{concentration}.$$

Embodiment 7: The method according to the preceding embodiments, wherein the dimension n of the set of parameters of the reference calibration function for the generic type of mass spectrometry devices exceeds the dimension m of the set of parameters of the signal adjustment function: n>m, specifically n>m+1.

Embodiment 8: The method according to any one of the three preceding embodiments, wherein at least one additional signal adjustment mechanism is incorporated, wherein the additional signal adjustment mechanism comprises an extension of a validity of the method for calibrating at least one mass spectrometry device.

Embodiment 9: The method according to any one of the four preceding embodiments, wherein the signal adjustment function is a linear function.

Embodiment 10: The method according to any one of the preceding embodiments, wherein the reference calibration function is a non-linear or rational function.

Embodiment 11: The method according to any one of the preceding embodiments, wherein the method step c) is conducted with a maximum of two or three calibrator samples.

Embodiment 12: The method according to any one of the preceding embodiments, wherein one or more of the method steps a1, a2, c1, c2 are performed by a computer.

Embodiment 13: A method for determining a concentration of an analyte in a sample, wherein the method comprises the following steps:

i. conducting the method for calibrating at least one mass spectrometry device according to any one of the preceding embodiments;

ii. conducting at least one measurement comprising measuring the analyte in the sample by using the mass spectrometry device thereby receiving measurement results;

iii. adapting the reference calibration function $f_{\hat{p}}$ based on the measurement results or adapting the measurement results to the reference calibration function $f_{\hat{p}}$;

iv. determining the concentration of the analyte based on the measurement results.

Embodiment 14: Mass spectrometry device having a first defined hardware configuration, wherein the mass spectrometry device comprises at least one control unit, wherein the control unit is configured for storing at least one reference calibration function $f_p$ for a generic type of mass spectrometry devices having a second defined hardware configuration, wherein the second defined hardware configuration is equivalent to the first defined hardware configuration, wherein the control unit is further configured for storing a set of parameters $p=(p_1, p_2, \ldots p_n)$ of the reference calibration function $f_p$, wherein n is a positive integer, wherein the reference calibration function $f_p$ describes a relationship of a concentration of at least one analyte in at least one calibrator sample, wherein the reference calibration function $f_p$ is a parametrized function $f_p$(concentration); wherein the control unit is further configured for storing calibration values $\hat{p}=(\hat{p}_1,\hat{p}_2, \ldots \hat{p}_n)$ for the set of parameters of the reference calibration function, wherein the control unit is further configured for conducting at least one customer-site recalibration step for the mass spectroscopy device, wherein the recalibration step comprises performing at least one calibration measurement using the mass spectrometry device on at least one calibrator sample having different concentrations of the analyte, thereby generating at least a calibration signal and wherein the one customer-site recalibration step further comprises generating calibration information based on the calibration signal.

Embodiment 15: A computer program, wherein the computer program is adapted to perform the method step c) of the method for calibrating at least one mass spectrometry device according to any one of the preceding embodiments referring to a method for calibrating at least one mass spectrometry device while the program is being executed on a computer.

Embodiment 16: A computer program product having program code means, wherein the program code means can be stored or are stored on a storage medium, for performing the method step c) of the method for calibrating at least one mass spectrometry device according to any one of the preceding embodiments referring to a method for calibrating at least one mass spectrometry device when the program code means are executed on a computer or on a computer network.

In order that the embodiments of the present disclosure may be more readily understood, reference is made to the following examples, which are intended to illustrate the disclosure, but not limit the scope thereof.

FIG. 1 shows schematically an exemplary embodiment of a system comprising a mass spectrometry device 110 according to the present disclosure. The mass spectrometry device 110 comprises at least one control unit 112. The system further comprises a generic type of mass spectrometry devices 114.

The mass spectrometry (MS) device 110 may be configured for detecting at least one analyte based on mass to charge ratio. The mass spectrometry device 110 may specifically be or may comprise a liquid chromatography mass spectrometry device. The liquid chromatography mass spectrometry device may be or may comprise at least one high-performance liquid chromatography (HPLC) device or at least one micro liquid chromatography (μLC) device. The liquid chromatography mass spectrometry device may comprise a liquid chromatography (LC) device and a mass spectrometry (MS) device, wherein the LC device and the MS are coupled via at least one interface. The interface coupling a liquid chromatography device and the MS may comprise at least one ionization source configured for generating of molecular ions and for transferring of the molecular ions into the gas phase. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest.

The analyte may be present in a sample and the presence and/or the concentration of which may be of interest for a user, a patient or medical staff such as a medical doctor. Particularly, the analyte may be or may comprise an arbitrary chemical substance or chemical compound which may take part in the metabolism of the user or the patient, such as at least one metabolite. The detection of the at least one analyte specifically may be an analyte-specific detection. However, also other kinds of analytes may be feasible. For example, the sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by having being mixed with reagents or the like. For example, analytes of interest may be vitamin D, drugs of abuse, therapeutic drugs, hormones, and metabolites in general.

The mass spectrometry device 110 has a first defined hardware configuration. For example, the hardware may comprise one or more of: sample preparation unit, a liquid chromatography unit, and a mass spectrometer, in particular a quadrupole mass spectrometer. The mass spectrometer 110 may be a triple quadrupole mass spectrometer. The hardware configuration may be a setting of hardware components of a particular instrument. For example, the setting may be application specific and/or may vary due to manufacturing tolerances.

The mass spectrometry device 110 may be calibrated by using a method according to the present disclosure which will be described in the following. The calibration may comprise an operation or a process of operation that determines a relationship between measurement signals generated by the mass spectrometry device 110 and a true concentration results of a sample. According to the present disclosure, the calibration may be split up and/or broken into two pieces or parts. In a first step, a reference calibration function which describes a relationship between a concentration and measurement signals generated by the generic mass spectrometry device 114, also denoted reference mass spectrometry device, coming from the properties for the analyte to be measured. This task may require a lot of effort, such as involving multiple instruments and replicate measurements. This task may be performed at the manufacturer site 117. In a second step, in order to obtain the true concentration result of samples on a particular instrument, an adaption of the reference calibration function may be made.

The method comprises the following steps:

- a) at least one manufacturer-site 116 pre-calibration step, comprising:
  - a1: establishing at least one reference calibration function $f_p$ for the generic type of mass spectrometry devices 114 having the second defined hardware configuration, wherein the second defined hardware configuration is equivalent to the first defined hardware configuration, wherein the reference calibration function $f_p$ describes a relationship of at least one concentration c of at least one analyte in at least one calibrator sample, wherein the reference calibration function $f_p$ is a parametrized function $$f_p(\text{concentration})$$

with $p=(p_1,p_2, \ldots p_n)$ being a set of parameters of the reference calibration function and n being a positive integer;

- a2: determining calibration values $\hat{p}=(\hat{p}_1,\hat{p}_2, \ldots \hat{p}_n)$ for the set of parameters of the reference calibration function for the generic type of mass spectrometry devices 114;

b) providing to a customer 118 of the mass spectrometry device 110 at least the following: the reference calibration function $f_p$ for the generic type of mass spectrometry devices 114, the calibration values $\hat{p}=(\hat{p}_1, \hat{p}_2, \ldots \hat{p}_n)$ for the generic type of mass spectrometry devices 110, and at least one calibrator sample having different concentrations of the at least one analyte; and c) at least one customer-site recalibration step for the mass spectrometry device 110, comprising:
   - c1: performing at least one calibration measurement using the mass spectrometry device 110 and at least one calibrator sample, thereby generating at least one calibration signal;
   - c2: generating calibration information based on the calibration signal.

The manufacturer may be a producer of the mass spectrometry device 110. The manufacturer may produce all parts of the mass spectrometry device 110 and/or the manufacturer may comprise suppliers for specific components of the mass spectrometry device 110. The manufacturer may be the final manufacturer providing the final product for use by a customer 118. The manufacturer-site 116 may comprise all processes which were performed by the manufacturer before providing the mass spectrometry device 110 to the customer 118. All reagents, columns, calibrators, system reagents, disposables may be produced by or for the manufacturer. In contrary at a customer-site 120, the customer 118 can place patient samples and control samples as non-manufacturer components on the mass spectrometry device 110. The manufacturer-site 116 and the customer-site 120 are separated in FIG. 1 by a dashed line 122. The establishment of a reference calibration function may be done during standardization process at the manufacturer-site 116. This may allow to invest more effort as solely one single calibration event on a single instrument.

In step a1, the reference calibration function is established. The establishing may comprise determining and/or fitting and/or deriving the reference calibration function. Specifically, a mathematical function may be determined. The process may specifically be conducted in a computer-assisted matter.

The generic type of mass spectrometry devices 114 may be or may comprise a plurality of reference and/or prototype mass spectrometry devices 124 such as of a series, in particular at the manufacturer-site 116. The particular instrument at the customer-site 120 may be within manufacturer tolerances identical to the generic type of mass spectrometry device 114. Specifically, the generic type of mass spectrometry devices 114 may have a same or similar hardware configuration as the particular instrument. However, also other kinds of common properties may be feasible.

The reference calibration function may be a calibration function that describes a relation between the concentration c and a signal, denoted “theoretical signal”. Specifically, the reference calibration function of a particular general LC/MS device describes the relationship between peak area ratios and concentration of the particular analyte on the particular instrument. The theoretical signal may be a signal of the reference mass spectrometry device. The signal may be a peak are ratio. The reference calibration may be non-instrument specific. Specifically, the reference calibration function may describe a relationship between the concentration of the at least one analyte and at least one corresponding theoretical signal for the specific analyte. The establishing of the reference calibration function may comprise involving multiple instruments and/or replicate measurements. Exemplarily, for this purpose, measurements on several different reference mass spectrometry devices 124 may be conducted and several calibration curves may be determined. The reference calibration function may be determined as mean of the several calibration curves. The reference calibration function may also be referred to as master calibration function.

The reference calibration function is a parametrized function $f_p$(concentration) with $p=(p_1, p_2, \ldots p_n)$ being a set of parameters of the reference calibration function and n being a positive integer. The relationship between the concentration of the at least one analyte and at least one corresponding theoretical signal for the analyte may be expressed by $$f\text{: concentration} \rightarrow \text{theoretical signal}$$

$$f_p(\text{concentration}) = \text{theoretical signal}$$

with $p=(p_1,p_2, \ldots p_n)$ being the set of parameters of the reference calibration function and n being a positive integer.

In step a2, the calibration values $\hat{p}=(\hat{p}_1, \hat{p}_2, \ldots \hat{p}_n)$ for the set of parameters of the reference calibration function for the generic type of mass spectrometry devices 114 are determined. The determining of the calibration values may comprise a process of calculation and/or of fitting. For example, the determining may comprise recording a plurality of signals from a plurality of replicate measurements of the reference mass spectrometry device using the calibrator sample or a plurality of calibrator samples and/or of a plurality of the reference mass spectrometry devices using the calibrator sample or a plurality of calibrator samples. For each of the recorded signals a corresponding concentration may be known. The determining of the calibration values may comprise at least one fitting procedure. The fitting procedure may comprise the reference calibration function $f_p$ as fit function and start values for the set of parameters of the reference calibration function. Specifically, the calibration value may refer to an established value of one of the parameters of the set of parameters of the parametrized function, e.g., established by using the fitting procedure. The determining of the calibration values may be performed during a standardization process at the manufacturer-site 116.

The reference calibration function may be a linear function. In other embodiments, the reference calibration function may be a non-linear function such as a rational function. In dependency on the reference calibration function the number of the parameters p may vary. As an example, in case of a linear function, a slope and an intercept may be expressed by parameters p. As a further example, upper and lower asymptotes and a monotonous slope may be expressed by parameters p.

The reference calibration function describes a relationship of at least one concentration c of the at least one analyte of the at least one calibrator sample. The calibrator sample is a sample having a defined target value. Specifically, the defined target value may refer to a known target value. Specifically, the defined target value may be a known concentration of a substance of the calibrator sample.

For example, the calibrator sample may be an internal standard sample. The internal standard sample may be a sample comprising at least one internal standard substance with a known concentration. The concentration of the internal standard substance in the sample may be determined in a reference laboratory. The internal standard sample may be measured and respective target values may be assigned. The internal standard substance may be identical to the analyte of interest or may be an analyte which generates by reaction or derivatization an analyte identical to the analyte of interest and/or may be an analyte of which the concentration is known and/or may be a substance which mimics the analyte of interest or that can be otherwise correlated to a certain analyte of interest.

For example, the calibrator sample may be at least one commercial calibrator. Target values, i.e., the concentration of at least one analyte of the sample, may be determined using at least one standardization set. The standardization set may comprise samples which were measured by a reference laboratory and to which at least one target value was assigned. The target values of this so called master calibrators, also denoted master calibrator target values, may be assigned by using the standardization set. These commercial calibrators with assigned target values may be used for determining the reference calibration function.

The calibrator sample provided in step b) and used in step c) may be a commercial calibrator sample. The manufacturer may provide the target values for the commercial calibrator sample to the customer 118. Specifically, the target value of the commercial calibrator sample may be determined by the manufacturer by using the master calibrator target value.

In step b) at least one information package 126 is provided to the customer. In step b), at least the following is provided to the customer of the mass spectrometry device 110: the reference calibration function $f_p$ for the generic type of mass spectrometry devices 114, the calibration values $\hat{p}=(\hat{p}_1,\hat{p}_2, \ldots \hat{p}_n)$ for the generic type of mass spectrometry devices 114, and at least one calibrator sample. The providing of the reference calibration function $f_p$, and/or of the calibration values $\hat{p}=(\hat{p}_1,\hat{p}_2, \ldots \hat{p}_n)$ for the generic type of mass spectrometry devices 114 may specifically be conducted electronically. The providing may be performed during delivery of the mass spectrometry device 110 to the customer 118. The control unit 112 is configured for storing at least one reference calibration function $f_p$. The control unit 112 is further configured for storing the set of parameters $p=(p_1, p_2, \ldots p_n)$ of the reference calibration function $f_p$, In the customer-site recalibration step, at least one calibrator sample may be used. The number of calibrator samples and number of replicates to be run by the customer may be assay specific.

In step c), the customer-site recalibration step for the mass spectrometry device 110 is performed. The recalibration step may be performed in order to obtain the true calibration results of samples on the particular instrument. The recalibration may comprise an adaption of the reference calibration function. This can be accomplished either by adapting of the reference calibration function to the signal situation of the particular instrument and/or by adapting of the signals of the particular instrument to the reference calibration function. For adapting of the reference calibration function to the signal situation of the particular instrument, the parameters of the calibration function may be changed. For adapting of the signals of the particular instrument to the reference calibration function, all instrument signals, e.g., peak area ratios, of the measured samples may be converted into so called-reference signals and these reference signals may be transformed into concentrations based on the pre-determined reference calibration curve.

The adaptation of the reference calibration function to the signal situation of a particular mass spectrometry device 110 used by a customer 118, is the instrument specific assay calibration. In order to obtain the true concentration results of samples on a particular mass spectrometry device, an adaptation of the information on the reference calibration function may be made. This may be accomplished by the adaptation of the peak area ratios of a particular mass spectrometry device 110 to the reference calibration function.

For both adaption steps, the information package 126 for the customer 118 may be the same. The customer 118 may receive calibrator sample with target values and parameters of the reference calibration curve and the reference calibration curve.

In step c1, at least one calibration measurements is conducted using the mass spectrometry device 110. The calibration measurement may comprise at least one measurement of the mass spectrometry device 110 of the customer 118 on the provided calibrator sample. Thereby, the calibration signal may be generated, e.g., acquired. The signal may be acquired for a desired calibrator sample. Thus, for each the calibrator samples a signal may be acquired.

The method step c), specifically the method step c1, may specifically be conducted with a maximum of two or three calibrator samples. However, also a conducting of the method step c) with a higher number of calibrator samples may be feasible. Exemplarily, the method step c), specifically the method step c1, may be conducted with at least four or at least five calibrator samples.

In step c2, calibration information based on the calibration signals is generated. The calibration information may comprise at least one relationship between the signal of the mass spectrometry device 110 of the customer 118, the theoretical signal of the generic type of mass spectrometry devices 114 and the concentration.

Specifically, in step c2, a so called signal adjustment function g may be used. The signal adjustment function may give the relationship between the signal of the mass spectrometry device 110 of the customer 118, denoted calibration signal in case of measuring the calibrator sample, and the theoretical signal of the reference mass spectrometry device. The signal adjustment function may be defined by $$g\text{: theoretical signal} \rightarrow \text{calibration signal}$$

$$g_q(\text{theoretical signal}) = \text{calibration signal}$$

wherein $q=(q_1, q_2, \ldots q_m)$ are a set of parameters of the signal adjustment function and m is a positive integer. The dimension n of the set of parameters of the reference calibration function for the generic type of mass spectrometry devices 114 may exceed the dimension m of the set of parameters of the signal adjustment function: n>m, specifically n>m+1.

Specifically, the signal adjustment function may be a linear function. Further, optionally, the reference calibration function may also be a linear function. However, the signal adjustment function may also be a non-linear function such as a rational function. In dependency on the signal adjustment function the number of the parameters q may vary. As an example, in case of a linear function, a slope and an intercept may be expressed by parameters q. As a further example, upper and lower asymptotes and a monotonous slope may be expressed by parameters q.

Generally, for determining the concentration from the signal of the mass spectrometry device 110 of the customer 118, also denoted sample reading, the following two inverse functions are required:

$$g_{\hat{q}}^{-1}(\text{calibration signal}) = \text{theoretical signal},$$

$$f_{\hat{p}}^{-1}(\text{theoretical signal}) = \text{concentration},$$

wherein with $\hat{q}=(\hat{q}_1,\hat{q}_2, \ldots \hat{q}_m)$ are established parameters of the signal adjustment function, which may be established during the calibration on the mass spectrometry device 110 of the customer 118 by using the calibrator sample. $g_{\hat{q}}^{-1}$ may be an inverse function of the signal adjustment function $g_{\hat{q}}$.

The calibrator sample, in particular the commercial calibrator sample, may be placed on the particular mass spectrometry device and a relationship is generated between the reference peak area ratios based on the reference calibration function and the peak area ratios of this mass spectrometry device. With this relationship all subsequent peak area ratios of measured samples can be converted into reference peak area ratios and these reference peak area ratios are transformed into concentrations based on the reference calibration function.

In an experiment, native samples were measured with acceptable bias and precision. The exemplary assay quantification of testosterone in human serum or plasma was chosen. The measurements were conducted on commercial Agilent HPLC and Sciex MS instruments, with hardware adaptations. The experiment was structured in three parts:

The first part of the experiment mimicked determining a standardization set. This part is also denoted reference standardization. Specifically, in the first part of the experiment, target values were assigned through a reference measurement procedure (RMP) to a set of native human samples, denoted sample curve, and distributed over a measuring interval of an assay. These samples served as anchor point of the measurement values of the whole measurement method. As analyte testosterone was used. The following measurements were performed:

| Experimental setup | |
|---|---|
| Number of native human samples | 30 |
| Concentration range of the human samples | 0.09 ng/ml – 12.4 ng/mL |
| Number of instruments/Type of instrument | 1/commercial LCMS system (Sciex 6500+) |
| Number of replicates per sample | 3 |

The median of the three individual analyses becomes the target value of each sample.

The second part mimicked assigning target values to master calibrator samples which, in particular subsequent, may be used in step a) of the method according to the present disclosure. These master calibrator samples should be distinguish from the commercial calibrator samples used in step c). The second part is also denoted master calibrator standardization. Target values were assigned to the master calibrator samples through a value transfer from the native human samples to the master calibrator samples.

The native human samples served as calibrators for the mass spectrometry device 110 and the master calibrator samples were read as samples. To mimic step a) for testosterone the following measurements were performed:

| Experimental setup | |
|---|---|
| Type and number of samples | As calibrator: Sample curve samples, 30 levels; as samples: master calibrator samples, 7 levels |
| Measurement method | analysis on a commercial LCMS instrument |
| Number of instruments/Type of instrument | 2/Sample preparation breadboard, Agilent 1290 HPLC, Sciex 6500+ MS |
| Number of replicates per sample | 1 day × 2 replicates |

The following settings were used for value transfer from the native human samples to the master calibrator samples:

calibration model: a Rational PADE[1,1] function (Pagliano et al. (2015), "Calibration graphs in isotope dilution mass spectrometry", Analytica Chemica Acta, 2015) with the following formula:

$$\text{Area ratio} = \frac{a + b * Conc}{1 + c * Conc}$$

with a weighting for calibration model fitting: $1/\text{Conc}^2$

For the target value assignment of the master calibrator samples, each of the instruments was calibrated with the native sample curve samples, given the calibration model and weighting mode. The median of the individual measured concentration was assigned as target value to each master calibrator sample.

In a next step, mimicking step a) the master calibrator samples with assigned target value were used as calibrator samples. The commercial calibrator samples were read as samples. In addition, the parameters of the reference calibration function were assigned. This is based on a new dataset, measured on a separate day, with the following measurement design:

| Experimental setup | |
|---|---|
| Type and number of samples | As calibrators: Master calibrators, 7 levels<br>As samples: Commercial calibrators, 2 levels |
| Measurement method | analysis on a commercial LCMS instrument |
| Number of instruments/Type of instrument | 2/Sample preparation breadboard, Agilent 1290 HPLC, Sciex 6500+ MS |
| Number of replicates per sample | 1 day × 2 replicates |

For determining of the target values of the commercial calibrator samples and the parameters of the reference calibration function, data of the master calibrator samples from both instruments were pooled. On this pooled data a calibration function was fitted and the estimated parameter values became the values of the reference calibration function. The commercial calibrator samples were read of this curve as samples. The median of the individual measured concentration was assigned as target value to each commercial calibrator sample.

A further part of the experiment mimicked step c) of the method according to the present disclosure. Specifically, it was shown that the proposed calibration concept using 2-level commercial calibrators and a pre-fabricated reference calibration function is suitable to measure native samples with acceptable bias and precision. A set of samples was measured over multiple days on commercial systems. Commercial calibrators (2 levels) were applied as calibrator samples as well as parameters of the reference calibration function. The following measurement plan within this experiment was performed:

| Experimental setup | |
|---|---|
| Type and number of samples | As calibrators: Commercial calibrators, 2 levels and parameters of the reference calibration function<br>As samples: Precision sample set, 10 samples, Bias sample set, 20 samples |

-continued

| Experimental setup | |
|---|---|
| Measurement method | commercial instrument |
| Number of instruments/Type of instrument | 1/Sample preparation breadboard, Agilent 1290 HPLC using 3 LC streams, Sciex 6500+ MS |
| Number of replicates per sample | Precision sample set: 1 replicate over 3 HPLC streams per day, on 10 days<br>Bias sample set: 1 replicate on 1 stream on 1 day |

The testosterone assay was calibrated at the beginning of the experiment. Based on the measurements of the commercial calibrators on each HPLC stream, stream adjusted calibration functions were calculated. For the subsequent 10 days of sample measurement, the calibration of day 1 and the given master calibration function was used for sample reading. In order to simulate customer conditions LC columns were exchanged after 5 days of measurement.

The precision experiment based on 10 samples (precision sample set) distributed over the whole measuring range with target values from reference standardization. The analysis was done over 10 days covering all three LC streams of the instrument, in total 30 measurements per sample.

In addition, 20 additional samples (bias sample set), were measured in singlicates, spread over the 10 days. Thus, together with randomly selected measurements out of the 10 samples of the precision data set a method comparison to the reference measurement procedure using all 30 native samples was carried out.

FIGS. 2A to 2E show the experimental results of the experiment as outlined above, in particular a comparison to a reference measurement procedure in which the concentration of the analyte of the sample under test was determined.

Figure 2A:
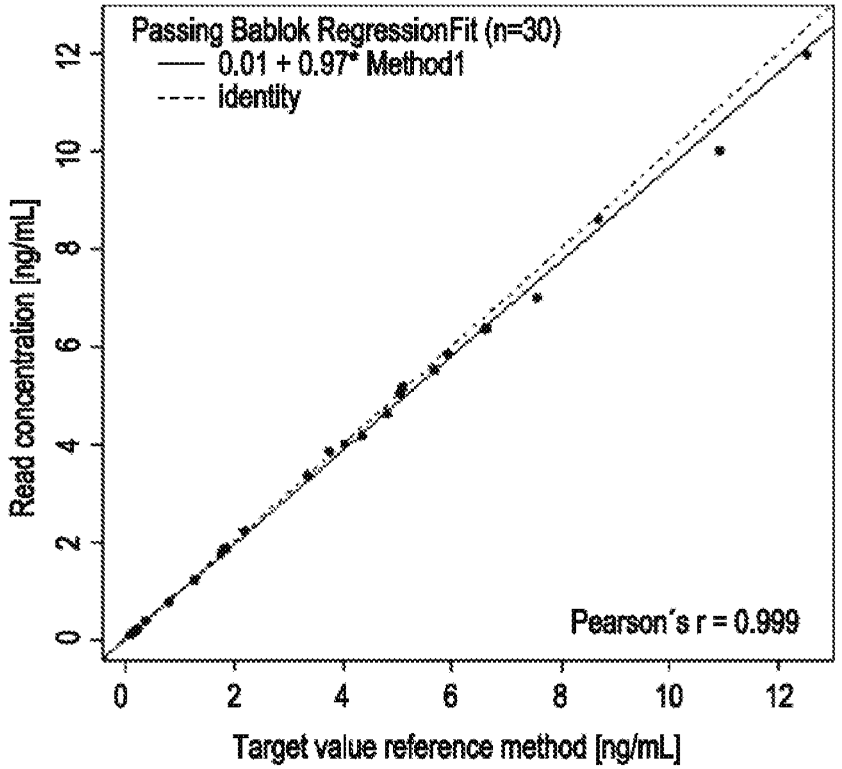
FIGS. 2A to 2E show the experimental results.

FIG. 2A shows a scatterplot of the concentrations of the native samples, determined by the reference method, wherein on the x-axis target value reference method [ng/mL] is shown, versus the concentrations values determined through the calibration process as described by the present disclosure are shown, wherein on the y-axis the read concentration [ng/mL] is shown, from 0 ng/mL-12 ng/mL testosterone.

Figure 2B:
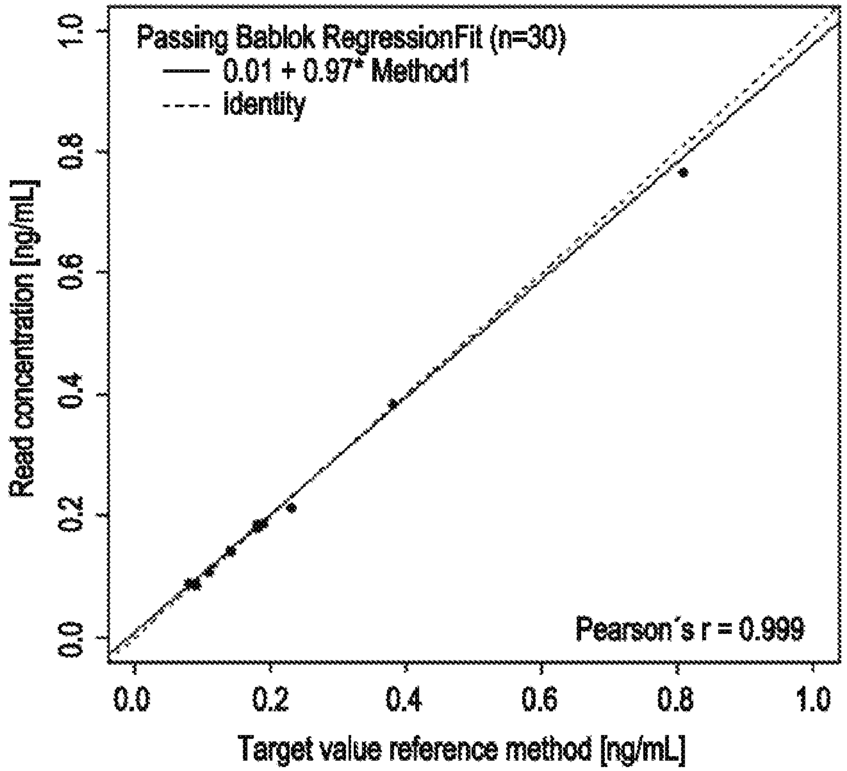

FIG. 2B shows a zoomed scatterplot of the concentrations of the native samples, determined by the reference method (x-axis—Target value reference method [ng/mL]) versus the concentrations values determined through the calibration process as described by the present disclosure (y-axis—Read concentration [ng/mL]), from 0 ng/mL-1 ng/mL testosterone. As it can be seen in both plots, the points are near the identity line (dashed line), in the lower, as well as over the whole concentration range of testosterone. The black line shows the Passing-Bablok regression line through the data points, which is given by: read concentration=0.01+0.97*reference method.

Figure 2C:
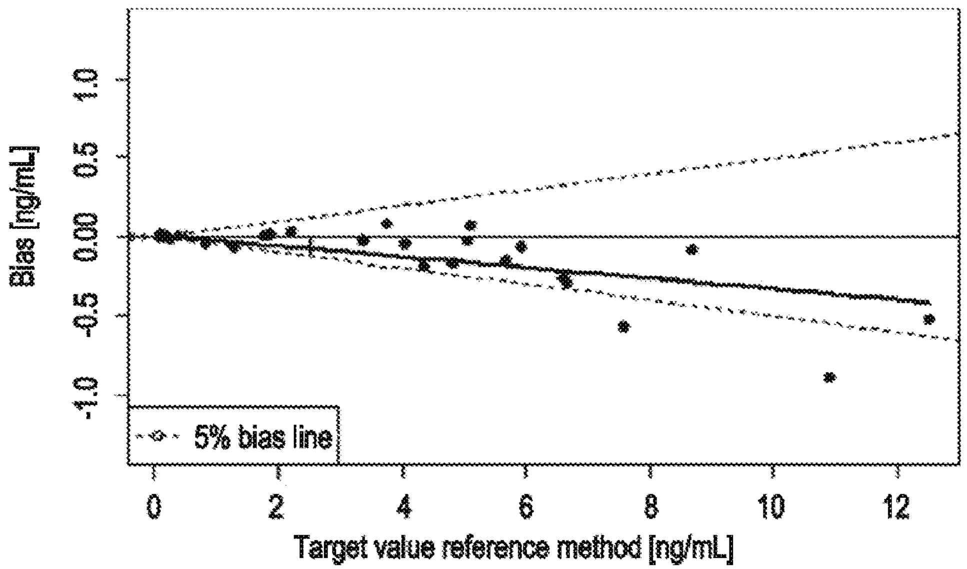

FIG. 2C shows the bias plot of these data points. The bias is defined by

Bias=reference method−read concentration.

On the x-axis the concentrations of the native samples, determined by the reference method (x-axis—Target value reference method [ng/mL]) is given, on the y-axis the bias of the read concentration (y-axis—Bias [ng/mL]). The horizontal black line is the bias=0 line. The two dashed lines, show the bias deviations of 5%, which is given here as acceptable bias. The black line is the mean bias line, which based on the Passing-Bablok regression fit, shown in FIG. 2A.

Figure 2D:
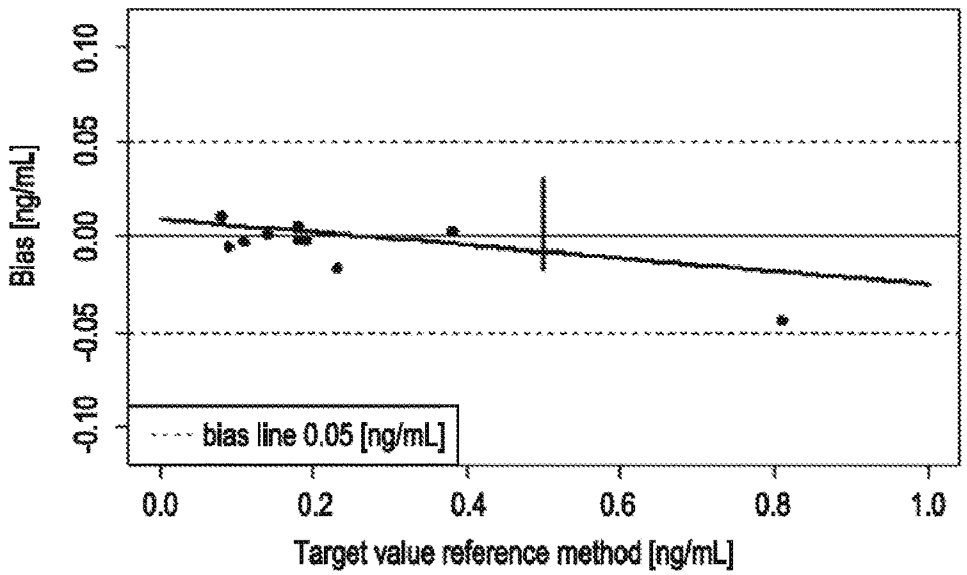

FIG. 2D shows a zoomed view of the bias plot of these data points, from 0 ng/mL-1 ng/mL testosterone, The horizontal black line is the bias=0 line. The two horizontal dashed lines, show the bias deviations of 0.05 ng/mL, which is given here as acceptable bias in the lower concentration range. The grey line is the mean bias line, which based on the Passing-Bablok regression fit, shown in FIG. 2A. The vertical grey line, shows the actual bias with 95% confidence intervals at the medical decision point of 0.5 ng/mL testosterone. Both plots show, that the mean bias, as well as the bias at the medical decision point stay well within the acceptable bias region.

Figure 2E:
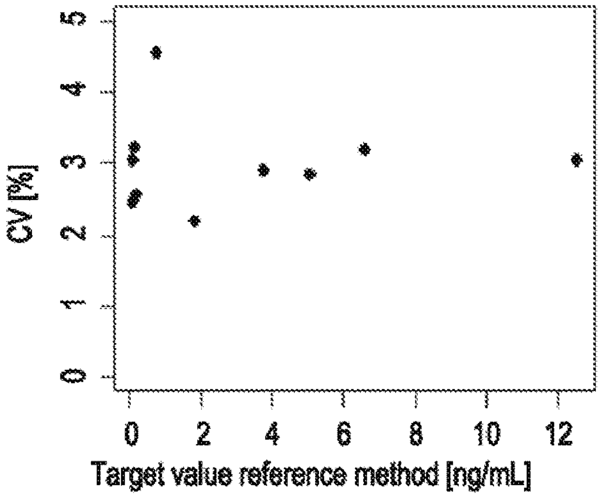

FIG. 2E shows a scatterplot of the concentrations of the native samples, determined by the reference method (x-axis—Target value reference method [ng/mL]) versus the coefficient of variation (CV[%]), determined from the repeated measurements of the samples of the precision sample set. The coefficient of variation is defined as $CV$[%]=(Standard Deviation/Target value reference method)*100.

FIG. 2E shows, that the CV for all samples ranges between 4.8% and 2%, which is an acceptable precision for testosterone.

LIST OF REFERENCE NUMBERS

- 110 mass spectrometry device
- 112 control unit
- 114 generic type of mass spectrometry devices
- 116 manufacturer-site
- 118 customer
- 120 customer-site
- 122 dashed line
- 124 reference/prototype mass spectrometry device
- 126 information package

What is claimed is:

1. A method for determining a concentration of an analyte in a sample, wherein the method comprises the following steps:

i. conducting a method for calibrating at least one mass spectrometry device having a first defined hardware configuration, the method comprising:

a) at least one manufacturer-site pre-calibration step, comprising:

a1: establishing at least one reference calibration function $f_p$ for a generic type of mass spectrometry devices having a second defined hardware configuration, wherein the second defined hardware configuration is equivalent to the first defined hardware configuration, wherein the reference calibration function $f_p$ describes a relationship of at least one concentration c of at least one analyte in at least one calibrator sample, wherein the reference calibration function $f_p$ is a parametrized function $$f_p(\text{concentration})$$

with $p=(p_1,p_2, \ldots p_n)$ being a set of parameters of the reference calibration function and n being a positive integer;

a2: determining calibration values $\hat{p}=(\hat{p}_1, \hat{p}_2, \ldots \hat{p}_n)$ for the set of parameters of the reference calibration function for the generic type of mass spectrometry devices;

b) providing to a customer of the mass spectrometry device at least the following: the reference calibration function $f_p$ for the generic type of mass spectrometry devices, the calibration values $\hat{p}=(\hat{p}_1, \hat{p}_2, \ldots p_n)$ for the generic type of mass spectrometry devices, and at least one calibrator sample with defined target value of the at least one analyte; and c) at least one customer-site recalibration step for the mass spectrometry device, comprising:

c1: performing at least one calibration measurement using the mass spectrometry device and the calibrator sample, thereby generating at least one calibration signal;

c2: generating calibration information based on the calibration signal, wherein in step c2 the calibration information based on the calibration signal is generated by adapting the calibration signal to the reference calibration function $f_{\hat{p}}$, wherein the calibration signal are converted into a theoretical signal $$g_{\hat{q}}^{-1}(\text{calibration signal})=\text{theoretical signal},$$

wherein g is the signal adjustment function defining a relationship between signals of the mass spectrometry device and a theoretical signal of the generic type of mass spectrometry devices and $\hat{q}=(\hat{q}_1, \hat{q}_2, \ldots \hat{q}_m)$ are calibration values of the signal adjustment function, wherein this theoretical signal is transformed into a concentration value by applying the inverse of the reference calibration function $$f_{\hat{p}}^{-1}(\text{theoretical signal})=\text{concentration};$$

ii. conducting at least one measurement comprising measuring the analyte in the sample by using the mass spectrometry device thereby receiving measurement results;

iii. adapting the reference calibration function $f_{\hat{p}}$ based on the measurement results or adapting the measurement results to the reference calibration function $f_{\hat{p}}$;

iv. determining the concentration of the analyte based on the measurement results.

2. The method according to claim 1, wherein in step c2 the calibration information based on the calibration signal is generated by adapting the reference calibration function $f_{\hat{p}}$ based on the calibration signal.

3. The method according to claim 2, wherein for adapting of the reference calibration function, a concentration of a measured calibrator sample can be determined by changing the function $f_{\hat{p}}^{-1}$ into a function $\tilde{f}_{\hat{p}}$ through application of $$f_{\hat{p}}^{-1}(g_{\hat{p}}^{-1}(\text{calibrator signal}))=\tilde{f}_{\hat{p}}(\text{calibrator signal}),$$

wherein g is a signal adjustment function defining a relationship between signals of the mass spectrometry device and a theoretical signal of the generic type of mass spectrometry devices.

4. The method according to claim 2, wherein the calibration values $\hat{p}=(\hat{p}_1, \hat{p}_2, \ldots \hat{p}_n)$ are adapted based on the calibration signal.

5. The method according to claim 1, wherein the dimension n of the set of parameters of the reference calibration function for the generic type of mass spectrometry devices exceeds the dimension m of the set of parameters of the signal adjustment function: $n>m$, specifically $n>m+1$.

6. The method according to claim 1, wherein at least one additional signal adjustment mechanism is incorporated, wherein the additional signal adjustment mechanism comprises an extension of a validity of the method for calibrating at least one mass spectrometry device.

7. The method according to claim 1, wherein the signal adjustment function is a linear function.

8. The method according to claim 6, wherein the method comprises an additional first signal adjustment, wherein a first signal is adjusted based on kinetic data.

9. The method according to claim 1, wherein the reference calibration function is a linear function.

10. The method according to claim 1, wherein the method step c) is conducted with a maximum of two or three calibrator samples.

11. A mass spectrometry device having a first defined hardware configuration, wherein the mass spectrometry device comprises at least one control unit, wherein the control unit is configured for storing at least one reference calibration function $f_p$ for a generic type of mass spectrometry devices having a second defined hardware configuration, wherein the second defined hardware configuration is equivalent to the first defined hardware configuration, wherein the control unit is further configured for storing a set of parameters $p=(p_1,p_2, \ldots p_n)$ of the reference calibration function $f_p$, wherein n is a positive integer, wherein the reference calibration function $f_p$ describes a relationship of a concentration of at least one analyte in at least one calibrator sample, wherein the reference calibration function $f_p$ is a parametrized function $f_p$(concentration);

wherein the control unit is further configured for storing calibration values $\hat{p}=(\hat{p}_1,\hat{p}_2, \ldots \hat{p}_n)$ for the set of parameters of the reference calibration function, wherein the control unit is further configured for conducting at least one customer-site recalibration step for the mass spectroscopy device, wherein the recalibration step comprises performing at least one calibration measurement using the mass spectrometry device on at least one calibrator sample sample with defined target value of the at least one analyte, thereby generating at least one calibration signal and wherein the one customer-site recalibration step further comprises generating calibration information based on the calibration signal.

12. A computer program, wherein the computer program is adapted to perform the method step c) of the method according to claim 1 while the program is being executed on a computer.

13. A computer program product having program code means, wherein the program code means can be stored or are stored on a storage medium, for performing the method step c) of the method according to claim 1 when the program code means are executed on a computer or on a computer network.

* * * * *